United States Patent [19]

Goldstein et al.

[11] Patent Number: 5,542,682

[45] Date of Patent: Aug. 6, 1996

[54] SLANT COIL SPRING AND SEAL

[75] Inventors: Clifford W. Goldstein, Boulder; Timothy F. Miller, Thornton, both of Colo.

[73] Assignee: American Variseal, Broomfiled, Colo.

[21] Appl. No.: 410,717

[22] Filed: Mar. 27, 1995

[51] Int. Cl.$^6$ ............................................. F16J 9/06
[52] U.S. Cl. ...................... 277/164; 277/157; 277/205; 267/1.5; 267/180
[58] Field of Search ................................. 277/163, 164, 277/205, 157, 158, 206 R; 267/167, 180, 248, 249, 1.5

[56] References Cited

U.S. PATENT DOCUMENTS

| | | | |
|---|---|---|---|
| 1,473,446 | 11/1923 | Scott | 277/163 |
| 2,211,760 | 8/1940 | Berg et al. | 267/180 |
| 2,449,479 | 9/1948 | Hopper et al. | 200/163 |
| 2,525,730 | 10/1950 | Schulze | 267/1 |
| 2,797,937 | 7/1957 | Frishof | 285/105 |
| 3,084,944 | 4/1963 | Stucke | 277/26 |
| 3,087,038 | 4/1963 | Bethke | 200/166 |
| 3,223,429 | 12/1965 | Reid | 277/153 |
| 3,323,785 | 6/1967 | Mather | 267/1 |
| 3,359,617 | 12/1967 | Baumler | 29/173 |
| 3,468,527 | 9/1969 | Maher | 267/167 |
| 3,527,507 | 9/1970 | Clark et al. | 308/3.5 |
| 3,653,670 | 4/1972 | Sifri et al. | 277/164 |
| 3,718,338 | 2/1973 | Traub | 277/165 |
| 3,765,690 | 10/1973 | Sievenpiper | 277/121 |
| 3,847,389 | 11/1974 | Rogers | 277/153 |
| 3,966,183 | 6/1976 | Mayer, Sr. | 267/167 |
| 4,053,166 | 10/1977 | Domkowski | 277/152 |
| 4,067,407 | 1/1978 | Berg | 277/153 |
| 4,143,883 | 3/1979 | Paynter | 277/164 |
| 4,231,578 | 11/1980 | Traub | 277/121 |
| 4,244,192 | 1/1981 | Chellis | 62/6 |
| 4,268,045 | 5/1981 | Traub | 277/121 |
| 4,304,409 | 12/1981 | Orlowski | 277/53 |
| 4,566,702 | 1/1986 | Traub | 277/121 |
| 4,655,462 | 4/1987 | Balsells | 277/164 |
| 4,658,847 | 4/1987 | McCrone | 137/12 |
| 4,706,970 | 11/1987 | Ramirez | 277/205 |

FOREIGN PATENT DOCUMENTS

| | | | |
|---|---|---|---|
| 238297 | 5/1960 | Australia | 267/180 |
| 409667 | 10/1932 | Denmark . | |
| 1011626 | 6/1952 | France | 277/163 |
| 1231867 | 11/1960 | France | 277/205 |
| 700403 | 12/1940 | Germany . | |
| 3130760 | 7/1981 | Germany . | |
| 46-9086 | 1/1971 | Japan . | |
| 60-95599 | 11/1986 | Japan . | |
| 28534 | 2/1987 | Japan | 267/167 |
| 695408 | 8/1953 | United Kingdom | 277/26 |
| 2029913 | 3/1980 | United Kingdom . | |
| WO91/10088 | 7/1991 | WIPO . | |

OTHER PUBLICATIONS

Bibliographic Data.

*Primary Examiner*—Daniel G. DePumpo
*Attorney, Agent, or Firm*—Poms, Smith, Lande & Rose Professional Corporation

[57] ABSTRACT

A coil spring including a plurality of coils connected to one another in series. Each of the coils has a front portion and a rear portion. The front portion of at least one of the coils includes a first section disposed at a first predetermined angle relative to a plane perpendicular to the spring centerline and a second section disposed at a second predetermined angle relative to the spring centerline. The coil spring is suitable for use in a variety of applications including, but not limited to, seals.

24 Claims, 3 Drawing Sheets

SLANT COIL SPRING AND SEAL

BACKGROUND OF THE INVENTION

1. Field of Invention

The present invention relates generally to slant coil springs and, more particularly, to an improved slant coil spring which may be used to provide a substantially even load distribution in a seal.

2. Description of the Related Art

Seals including coil springs have been used to seal relatively reciprocating surfaces, such as those found in piston and cylinder arrangements and hydraulic rams, and relatively rotating surfaces, such as those found in rotating shaft and housing arrangements. Such seals are generally composed of an annular cup having a substantially U-shaped cross-section and an annular coil spring located within the cup. Typically, the cup is formed from a durable resilient elastomeric material. The coil spring forces the outer portion of the annular cup radially outwardly into engagement with the cylinder or housing and also forces the inner portion radially inwardly into engagement with the piston or rotating element. One example of this type of seal is disclosed in U.S. Pat. No. 3,223,426, which issued on Dec. 14, 1965.

Originally, these seals were provided with conventionally formed coil springs. The springs were deformed during assembly of the seal in such a manner that the individual coils were inclined at an angle relative to the axis of the spring, thereby preloading the spring and producing a radial force. Unfortunately, when coil springs were deformed in this manner, the pressure exerted by each individual coil could not be effectively controlled and the amount of distortion would vary. Thus, the action of the spring as a whole would not be uniform and the seal could not be used in applications which require a controlled and substantially uniform load over a wide range of deflection.

In an attempt to solve the problems associated with the preloading of coil springs, so-called slant coil springs were developed. Slant coil springs include coils having a portion which is inclined with respect to the spring's axis. Such springs tend to provide uniform and predictable load characteristics. One example of such a spring is disclosed in Patent Cooperation Treaty application No. PCT/US90/07682, which was published on Jul. 11, 1991.

While overcoming many of the problems associated with preloaded coil springs, prior art slant coil springs have presented a new set of problems, especially in the area of seals. In particular, individual coils in prior art slant coil springs form a steep angle of contact with the elastomeric material. This is especially true when prior art slant coil springs are bent into an annular shape for use in an annular seal. Here, a steep angle is formed between each individual coil and the inner and outer portions of the cup. As a result, the load generated by the spring is not evenly distributed over the resilient material. Rather, the load is imparted at a series of "points" with unloaded sections therebetween. The uneven load distribution and concentrated forces cause the resilient material to wear unevenly, which eventually reduces the integrity of the seal.

SUMMARY OF THE INVENTION

The general object of the present invention is to provide an improved slant coil spring which obviates, for practical purposes, the aforementioned problems associated with prior art slant coil springs.

In particular, one object of the present invention is to provide an improved slant coil spring having coils which do not form relatively steep angles with respect to objects abutting the spring.

Another object of the present invention is to provide an improved slant coil spring which distributes loads more evenly over objects which abut the spring than prior art slant coil springs.

Still another object of the present invention is to provide an improved slant coil spring which has a larger contact surface than prior art slant coil springs.

A further object of the present invention is to provide an improved slant coil spring which is particularly well suited for use in annular seals.

A still further object of the present invention is to provide a seal which includes the improved slant coil spring.

In order to accomplish these and other objectives, a slant coil spring in accordance with the present invention includes a plurality of coils connected to one another in series. Each of the coils has a front portion and a rear portion. The front portion of at least one of the coils includes a first section disposed at a first predetermined angle relative to a plane perpendicular to the spring centerline and a second section disposed at a second predetermined angle relative to the plane.

The present slant coil spring provides a number of advantages over the prior art. For example, when the second angle is greater than the first angle, the second section provides a smaller contact angle than prior art slant coil springs. In addition, the second section may provide a substantially flat surface which distributes loads more evenly over devices which are in contact with the spring. Where the device is the resilient member of a seal, such improved load distribution prevents uneven resilient member wear, reduces the pressure applied to the material by increasing the area over which the spring force is applied, and improves the long-term integrity of the seal.

The above described and many other features and attendant advantages of the present invention will become apparent as the invention becomes better understood by reference to the following detailed description considered in conjunction with the accompanying drawings.

BRIEF DESCRIPTION OF THE DRAWINGS

Detailed description of preferred embodiments of the invention will be made with reference to the accompanying drawings.

DETAILED DESCRIPTION OF THE PREFERRED EMBODIMENTS

The following is a detailed description of the best presently known mode of carrying out the invention. This description is not to be taken in a limiting sense, but is made merely for the purpose of illustrating the general principles of the invention. The scope of the invention is defined by the appended claims.

Figure 1:
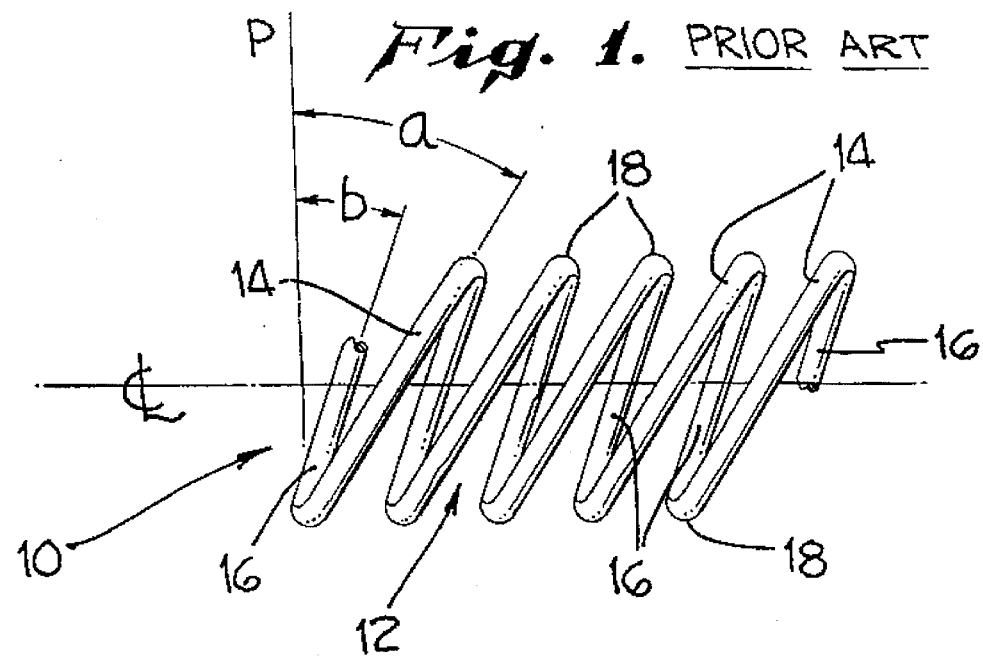
FIG. 1 is a side view of a prior art slant coil spring.

Referring to the numbered elements in FIG. 1, exemplary prior art slant coil spring 10 includes a plurality of coils 12 arranged in series. Each coil includes a front portion 14 and a rear portion 16. When viewed from the side, the front and rear portions extend in a straight line from top to bottom and connect at junction 18. Front portions 14 each form an angle a with a plane P perpendicular to a centerline CL and rear portions 16 each form an angle b with the plane. These angle are constant along the respective lengths of the front and rear portions.

Figure 2:
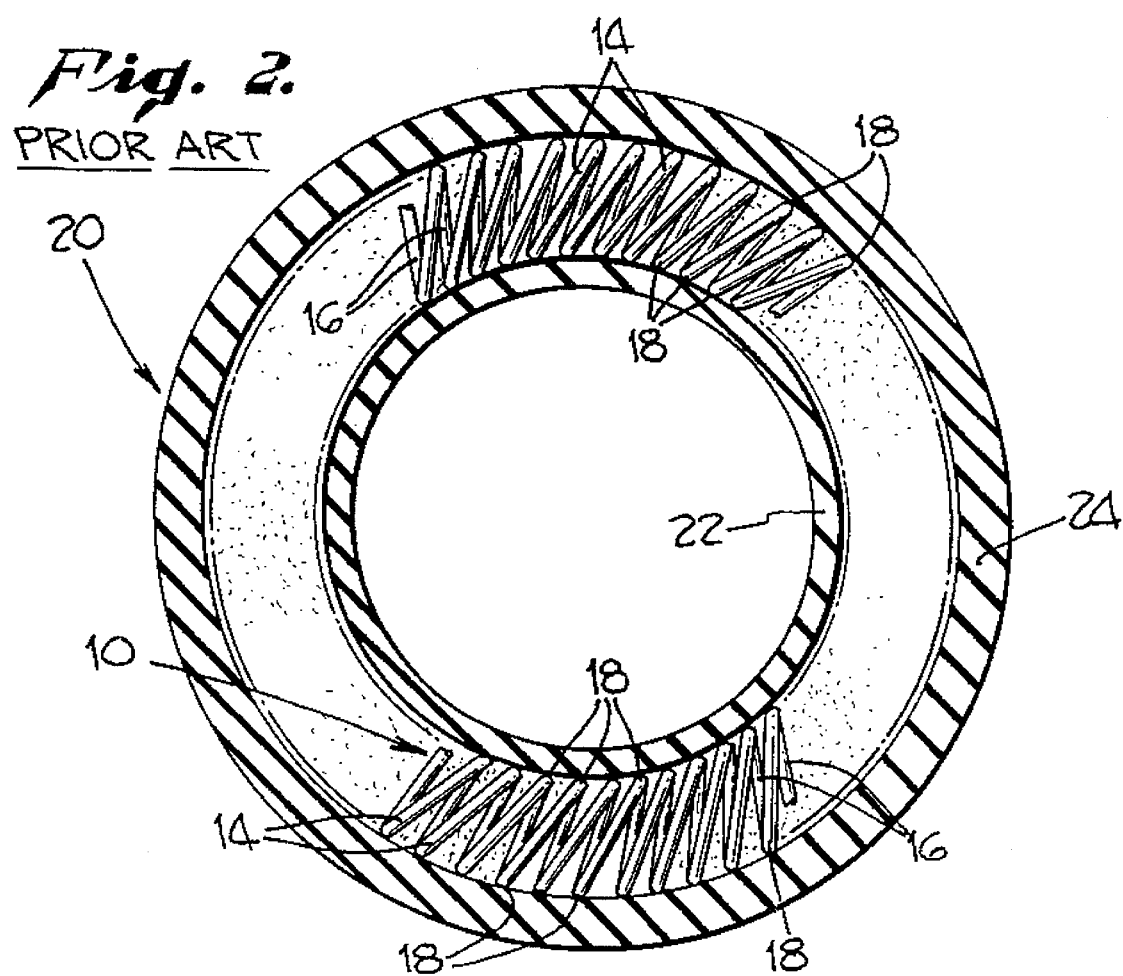
FIG. 2 is a front partial section view of an annular seal including a prior art slant coil spring.

FIG. 2 illustrates an annular seal 20 including prior art slant coil spring 10 (partially shown). The seal includes an inner wall 22 and an outer wall 24 formed from an elastomeric material. Spring junctions 18 abut the outer periphery of inner wall 22 and the inner periphery of outer wall 24. As FIG. 2 clearly shows, the shape of prior art slant coil spring 10 results in a sharp contact angle between the spring and the inner and outer walls. Thus, a series of circumferentially spaced spring/wall contact "points" are formed. A load is imparted by the spring at each of these "points" and no load is imparted in the spaces therebetween. As described above, the uneven application of force to the elastomeric wall material will result in uneven wear and a reduction in seal integrity.

Figure 3:
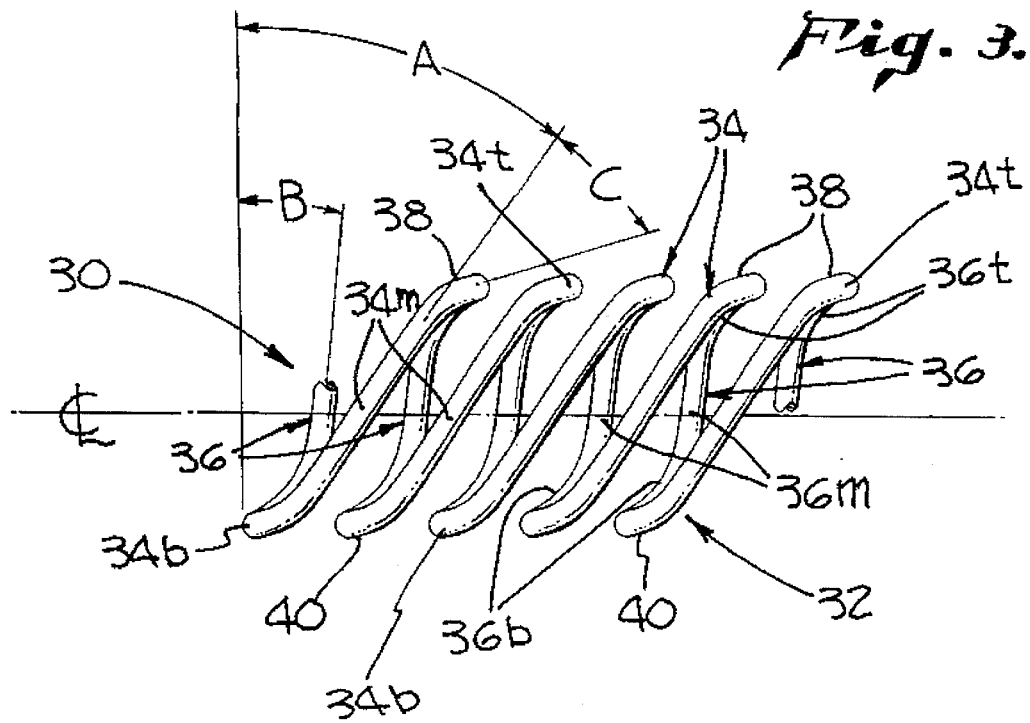
FIG. 3 is a side view of a slant coil spring in accordance with a preferred embodiment of the present invention.

As illustrated for example in FIG. 3, an exemplary slant coil spring 30 in accordance with the present invention includes a plurality of coils 32, each including a front portion 34 and a rear portion 36. A middle section 34m of front portion 34 forms an angle A with a plane P perpendicular to a centerline CL and a middle section 36m of rear portion 36 forms an angle B with the plane. The front and rear portions do not extend in a straight line from top to bottom. Rather, in the exemplary embodiment, top section 34t of front portion 34 forms an angle C with middle section 34m and bottom section 34b forms an angle with the middle section which may either be equal to angle C or slightly different should a particular application so require. Thus, top section 34t forms an angle with plane P equal to the sum of angles A and C. A similar angle is formed by bottom section 34b. Also, top and bottom sections 36t and 36b of rear portion 36 form respective angles with middle section 36m. These angles vary according to the respective values of angles A, B and C.

In accordance with the illustrated embodiment, angle A may vary from approximately 20° to approximately 50°, angle B may vary from approximately 0° to approximately 40°, and angle C may vary from approximately 5° to approximately 30°.

Top sections 34t and 36t of the front and rear portions form a substantially flat surface 38, while bottom sections 34b and 36b form a substantially flat surface 40. The flat surfaces provide an increased area of contact, or "footprint," between the present spring and, for example, a resilient member in a seal. By increasing the contact area, spring 30 provides a more even distribution of spring force than that previously known in the art. In addition, because the force is distributed over a greater area, the pressure on portions of the resilient member in contact with spring 30 is reduced.

Figure 4:
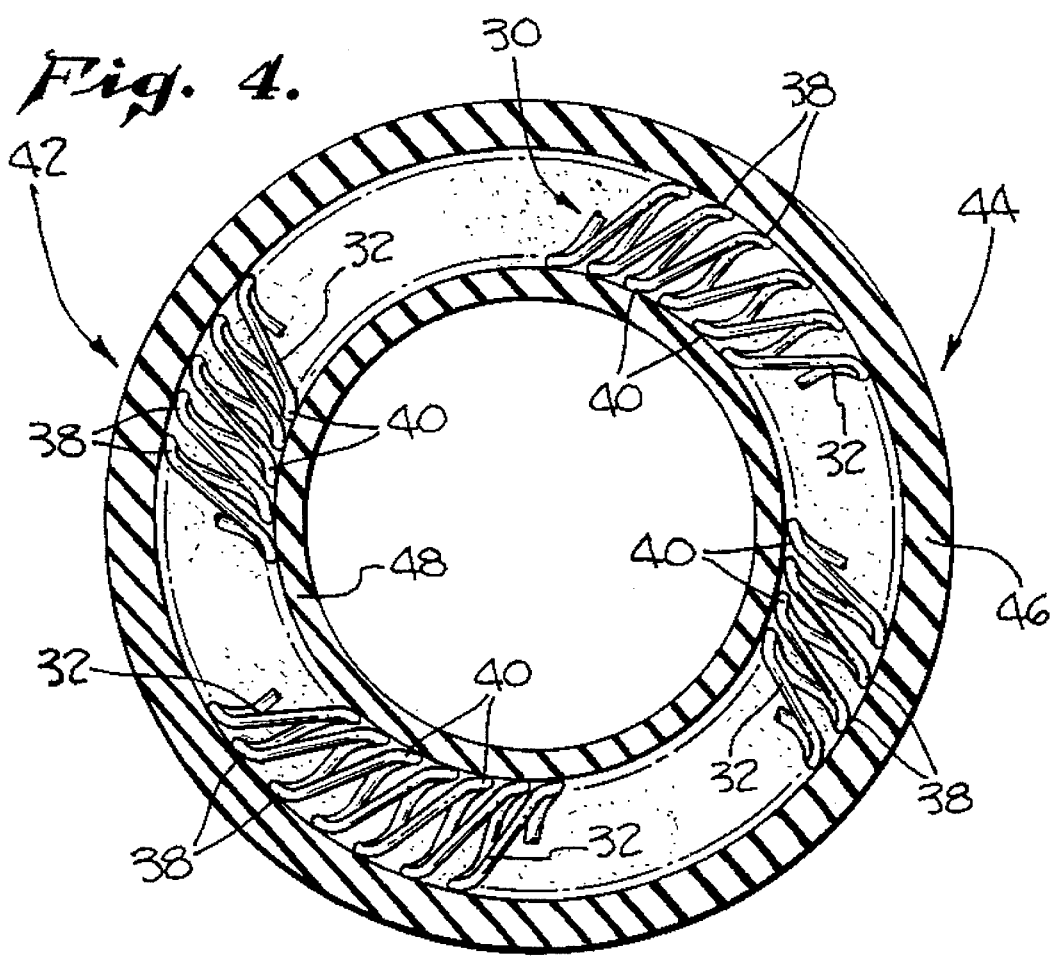
FIG. 4 is a front partial section view of an annular seal including a slant coil spring in accordance with the present invention.
Figure 5:
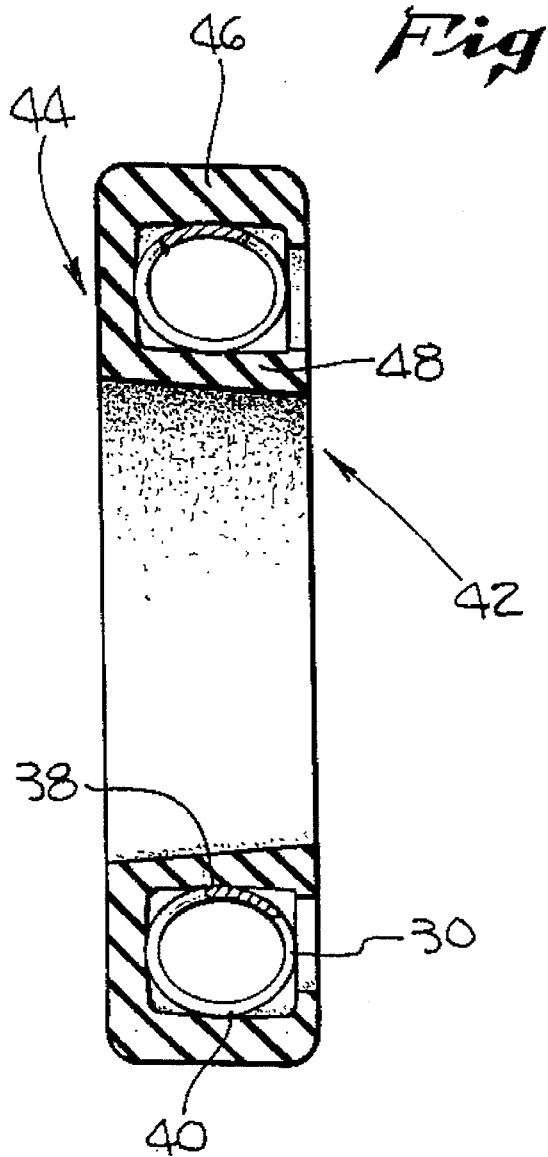
FIG. 5 is a partial side section view of the annular seal illustrated in FIG. 4.

As illustrated for example in FIGS. 4 and 5, spring 30 (which is partially shown) may be bent into an annular shape and form part of an annular seal 42. The annular seal includes a resilient member 44 having an outer wall 46 and an inner wall 48. Flat surfaces 38 and 40 of the spring abut the inner and outer walls. The flat surfaces form a larger contact area between individual coils 32 and resilient member 44 than that of prior art springs, such as the spring illustrated in FIGS. 1 and 2. As such, the present spring's force is more evenly distributed over the resilient member.

Figure 7A:
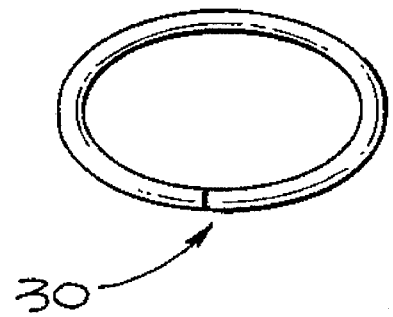
FIGS. 7a–b are end views of slant coil springs in accordance with the present invention.
Figure 7B:
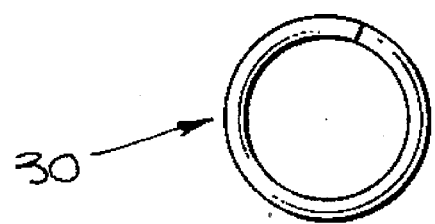
Figure 6:
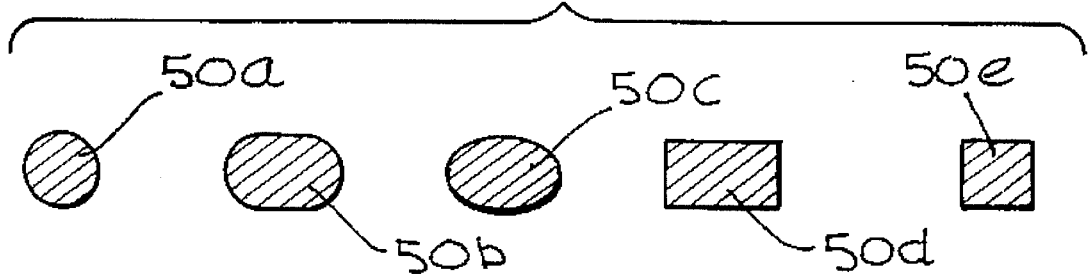
FIG. 6 is a plurality of section views of wire types from which the present slant coil spring may be formed.

Spring 30 may be composed of wire having a variety of cross-sectional shapes. As illustrated in FIG. 6, the cross-sectional shapes may include a circle 50a, an ovoid 50b, an oval 50c, and rectangles 50d and 50e (rectangle 50e being a square). Spring 30 may also be formed in a variety of shapes. Referring to FIGS. 7a–b, such shapes include ovals and circles. The spring can be made from any of the resilient metallic materials which are conventionally used to make seal energizers. The preferred spring material is a resilient metallic material such as stainless steel, Hastelloy, Elgiloy and Imconel, but the spring may be formed from any other suitable material. Obviously, the degree of slant of the front and rear portions, the dimensions of the wire and spring, the number of coils per inch, as well as the material from which the coils are formed, may be varied in accordance with the application for which the spring is intended. Resilient member 44 may be formed from a variety of materials including, but not limited to, rubbers, thermoplastic polyurethanes, fluoropolymers, block copolymers, thermoplastic vulcanizates and plastic/rubber alloys. The choice of resilient materials depends on the intended application of the seal and may include any of the conventional materials used for such seals.

Although the present invention has been described in terms of the preferred embodiment above, numerous modifications and/or additions to the above-described preferred embodiments would be readily apparent to one skilled in the art. For example, seals having coil springs have also been used to provide a seal between two uneven or non-parallel surfaces, such as those found in applications where heat or physical abuse may cause some misalignment between a door and a housing. The seals typically include a longitudinally extending resilient body with a coil spring within the resilient body. The present slant coil spring may also be used in such seals. It is intended that the scope of the present invention extends to all such modifications and/or additions and that the scope of the present invention is limited solely by the claims set forth below.

What is claimed is:

1. A coil spring comprising a number of coils connected to one another in series and defining a spring centerline, each coil in the series having a front portion and a rear portion, the front portion of the coils including a first front section disposed at a first predetermined angle greater than zero relative to a plane perpendicular to the spring centerline and a second front section disposed at a second predetermined angle greater than zero relative to the plane, the second predetermined angle being substantially greater than the first predetermined angle, the rear portion of the coils including a first rear section disposed at a third predetermined angle relative to the plane and a second rear section disposed at a fourth predetermined angle relative to the plane, the fourth predetermined angle being substantially greater than the third predetermined angle.

2. A coil spring as claimed in claim 1, wherein the first predetermined angle is substantially between approximately 20° and 50° and the second predetermined angle is substantially between approximately 25° and 80°.

3. A coil spring as claimed in claim 1, wherein the second front section of each coil defines a substantially flat surface.

4. A coil spring as claimed in claim 1, wherein coils at opposing ends of the spring are connected to one another such that the spring defines a substantially annular shape, an inner circumference and an outer circumference.

5. A coil spring as claimed in claim 4, wherein the second front section of each coil defines a substantially flat surface extending in a direction substantially tangential to the inner circumference.

6. A coil spring as claimed in claim 1, wherein the coils comprise wire defining a substantially circular cross-section.

7. A coil spring as claimed in claim 1, wherein the coils comprise wire defining a substantially rectangular cross-section.

8. A coil spring as claimed in claim 1, wherein the front portion of each coil includes a third front section disposed at a fifth predetermined angle relative to the plane, the fifth predetermined angle being substantially greater than the first predetermined angle.

9. A coil spring as claimed in claim 1, wherein each coil defines a substantially circular shape.

10. A coil spring as claimed in claim 1, wherein each coil defines a substantially elliptical shape.

11. A seal, comprising:

a resilient member; and a coil spring abutting at least a portion of the resilient member, the coil spring including a number of coils connected to one another in series and defining a spring centerline, each coil having a front portion and a rear portion, the front portion of at least one of the coils having a first section disposed at a first predetermined angle relative to a plane perpendicular to the spring centerline and a second section disposed at a second predetermined angle relative to the plane, the second predetermined angle being different than the first predetermined angle.

12. A seal as claimed in claim 11, wherein the resilient member includes a pair of side walls and a channel between the side walls and the coil spring is located substantially within the channel.

13. A seal as claimed in claim 12, wherein the channel comprises a substantially annular channel and the coil spring defines a substantially annular shape.

14. A seal as claimed in claim 13, wherein the second section of the front portion of the at least one coil abuts one of the side walls.

15. A seal as claimed in claim 11, wherein the second section of the front portion of the at least one coil defines a substantially flat surface.

16. A seal as claimed in claim 11, wherein the coils comprise wire defining a substantially circular cross-section.

17. A seal as claimed in claim 11, wherein the coils comprise wire defining a substantially rectangular cross-section.

18. A seal as claimed in claim 11, wherein the first predetermined angle is substantially less than the second predetermined angle.

19. A seal as claimed in claim 11, wherein the front portion of the at least one coil includes a third section disposed at a third predetermined angle relative to the plane, the third predetermined angle being different than the first predetermined angle.

20. A seal as claimed in claim 11, wherein each coil defines a substantially circular shape.

21. A seal as claimed in claim 11, wherein each coil defines a substantially elliptical shape.

22. A seal as claimed in claim 11, wherein the at least one coil comprises a plurality of coils.

23. A seal as claimed in claim 11, wherein the at least one coil comprises substantially all of the coils.

24. A seal, comprising:

a resilient member; and a coil spring abutting at least a portion of the resilient member, the coil spring including a number of coils connected to one another in series and defining a spring centerline, each coil in the series having a front portion and a rear portion, the front portion of the coils including a first front section disposed at a first predetermined angle greater than zero relative to a plane perpendicular to the spring centerline and a second front section disposed at a second predetermined angle greater than zero relative to the plane, the second predetermined angle being substantially greater than the first predetermined angle, the rear potion of the coils including a first rear section disposed at a third predetermined angle relative to the plane and a second rear section disposed at a fourth predetermined angle relative to the plane, the fourth predetermined angle being substantially greater than the third predetermined angle.

* * * * *